(12) United States Patent
Sato (10) Patent No.: US 11,204,465 B2
(45) Date of Patent: Dec. 21, 2021

(54) OPTICAL FIBER HOLDER AND FUSION-SPLICING APPARATUS INCLUDING OPTICAL FIBER HOLDER

(71) Applicant: SEI OPTIFRONTIER CO., LTD., Yokohama (JP)

(72) Inventor: Ryuichiro Sato, Yokohama (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 608 days.

(21) Appl. No.: 16/085,749

(22) PCT Filed: Feb. 9, 2017

(86) PCT No.: PCT/JP2017/004675
§ 371 (c)(1),
(2) Date: Sep. 17, 2018

(87) PCT Pub. No.: WO2017/159134
PCT Pub. Date: Sep. 21, 2017

(65) Prior Publication Data
US 2020/0292755 A1 Sep. 17, 2020

(30) Foreign Application Priority Data

Mar. 18, 2016 (JP) .............................. JP2016-055372

(51) Int. Cl.
*G02B 6/255* (2006.01)

(52) U.S. Cl.
CPC ......... *G02B 6/2555* (2013.01); *G02B 6/2553* (2013.01)

(58) Field of Classification Search
None
See application file for complete search history.

(56) References Cited

U.S. PATENT DOCUMENTS

| | | | |
|---|---|---|---|
| 10,551,564 B2* | 2/2020 | Kurino | G02B 6/25 |
| 2005/0276549 A1* | 12/2005 | Tabata | G02B 6/3636 385/96 |
| 2011/0247200 A1* | 10/2011 | Leyva, Jr. | G02B 6/3616 29/700 |

(Continued)

FOREIGN PATENT DOCUMENTS

| | | |
|---|---|---|
| EP | A1-1752804 | 2/2007 |
| JP | A-2001-208931 | 8/2001 |

(Continued)

*Primary Examiner* — Jerry Rahll
(74) *Attorney, Agent, or Firm* — Faegre Drinker Biddle & Reath LLP (57) ABSTRACT

An optical fiber holder for holding an optical fiber includes a holder body part on which a first optical fiber and a second optical fiber having a different outer diameter are mountable, a lid body which is disposed to the holder body part, and a fiber posture correction block which is provided on the lid body on a side close to a terminal processing part of the first optical fiber and the second optical fiber. The holder body part includes a first regulating part at an end part thereof on a terminal processing part side, and the first regulating part regulates movement of a first glass fiber of the first optical fiber and a second glass fiber of the second optical fiber. The fiber posture correction block includes a contact part to contact the second optical fiber at an end part thereof on the terminal processing part side.

4 Claims, 13 Drawing Sheets

(56) References Cited

U.S. PATENT DOCUMENTS

| | | | | |
|---|---|---|---|---|
| 2013/0236145 A1* | 9/2013 | Sato | .............. | G02B 6/2555 385/96 |
| 2013/0236146 A1* | 9/2013 | Takayanagi | .......... | G02B 6/2555 385/96 |
| 2014/0131326 A1* | 5/2014 | Sato | .............. | G02B 6/2553 219/121.58 |
| 2020/0292755 A1* | 9/2020 | Sato | .............. | G02B 6/2553 |

FOREIGN PATENT DOCUMENTS

| | | |
|---|---|---|
| JP | 2004-279665 A | 10/2004 |
| JP | 2007-127880 A | 5/2007 |
| JP | 3132149 U | 5/2007 |
| JP | A-2010-243702 | 10/2010 |
| JP | 2014-238480 A | 12/2014 |

\* cited by examiner

OPTICAL FIBER HOLDER AND FUSION-SPLICING APPARATUS INCLUDING OPTICAL FIBER HOLDER

TECHNICAL FIELD

The present invention relates to an optical fiber holder and a fusion-splicing apparatus including the optical fiber holder.

This application claims the priority of Japanese Patent Application No. 2016-055372, filed on Mar. 18, 2016, the entire contents of which are incorporated herein by reference.

BACKGROUND ART

Patent Document 1 discloses an invention relating to an optical fiber holder for holding to fix an optical fiber. It is disclosed that the optical fiber holder includes a holder base including an optical fiber accommodating groove, and a lid body which is disposed above the optical fiber accommodating groove to be openable and closable and includes a pressing member to be in contact with the optical fiber, and an inclined guide is provided at a tip end of the pressing member as a contact part for pressing to bend the optical fiber.

PRIOR ART DOCUMENT

Patent Document

Patent Document 1: JP-A-2007-127880

SUMMARY OF THE INVENTION

Means for Solving the Problems

An optical fiber holder of the present invention is an optical fiber holder for holding an optical fiber, including:

a holder body part on which a first optical fiber and a second optical fiber are mountable, the second optical fiber having a coated part with an outer diameter larger than that of a coated part of the first optical fiber;

a lid body which is disposed to be openable and closable with respect to the holder body part; and a fiber posture correction block which is provided on the lid body on a side close to a terminal processing part of the first optical fiber and the second optical fiber, wherein the holder body part includes a first regulating part at an end part thereof on a terminal processing part side, and the first regulating part is configured to regulate movement of a first glass fiber exposed from the first optical fiber and a second glass fiber exposed from the second optical fiber, and wherein the fiber posture correction block includes a contact part to be in contact with the second optical fiber at an end part thereof on the terminal processing part side.

A fusion-splicing apparatus of the present invention includes the above-described optical fiber holder and is configured to fusion-splice optical fibers held by the optical fiber holder.

DETAIL DESCRIPTION OF EMBODIMENTS

Problems to be Solved by the Invention

In the optical fiber holder described above, the contact part provided on the pressing member is formed so as to include a regulating part for regulating movement of the optical fiber in a lateral width direction. However, since a size of a gap part between the optical fiber accommodating groove and the pressing member is fixed, it is difficult to hold to fix optical fibers having different outer diameters.

An object of the present invention is to provide an optical fiber holder capable of holding a plurality of kinds of optical fibers having different outer diameters and to provide a fusion-splicing apparatus including the optical fiber holder.

Effects of the Invention

According to the present invention, an optical fiber holder capable of holding a plurality of kinds of optical fibers having different outer diameters and a fusion-splicing apparatus including the optical fiber holder can be provided.

Summary of Embodiments of the Present Invention

First, the summary of embodiments of the present invention will be described. An optical fiber holder according to an example of the present embodiment is as follows.

(1) An optical fiber holder for holding an optical fiber, including:

a holder body part on which a first optical fiber and a second optical fiber are mountable, the second optical fiber having a coated part with an outer diameter larger than that of a coated part of the first optical fiber;

a lid body which is disposed to be openable and closable with respect to the holder body part; and a fiber posture correction block which is provided on the lid body on a side close to a terminal processing part of the first optical fiber and the second optical fiber, wherein the holder body part includes a first regulating part at an end part thereof on a terminal processing part side, and the first regulating part is configured to regulate movement of a first glass fiber exposed from the first optical fiber and a second glass fiber exposed from the second optical fiber, and wherein the fiber posture correction block includes a contact part to be in contact with the second optical fiber at an end part thereof on the terminal processing part side.

According to this configuration, the first regulating part is provided on the holder body part and the fiber posture correction block is provided on the end part of the holder body part, so that an optical fiber holder capable of holding a plurality of kinds of optical fibers having different outer diameters can be provided.

(2) It may be preferable that an inner surface side of the contact part includes an inclined part configured to correct a posture of a third optical fiber which is configured by providing a jacket on an outer circumference of the first optical fiber or the second optical fiber.

(3) It may be preferable that the contact part includes a second regulating part configured to regulate movement of the second optical fiber.

(4) It may be preferable that the fiber posture correction block is formed with a recessed part configured to accommodate the jacket of the third optical fiber on a side closer to the lid body than the contact part.

According to these configurations, the second optical fiber having a large diameter or the glass fiber exposed from the third optical fiber can be appropriately accommodated in the first regulating part.

Further, a fusion-splicing apparatus according to an example of the present embodiment includes:

(5) the optical fiber holder according to any one of (1) to (4), and the fusion-splicing apparatus is configured to fusion-splice optical fibers held by the optical fiber holder.

According to this configuration, a fusion-splicing apparatus capable of fusion-splicing glass fibers by holding a plurality of kinds of optical fibers having different outer diameters with an optical fiber holder can be provided.

Details of Embodiments of the Present Invention

Hereinafter, embodiments of an optical fiber holder and a fusion-splicing apparatus according to the present invention will be described with reference to the drawings.

Figure 1:
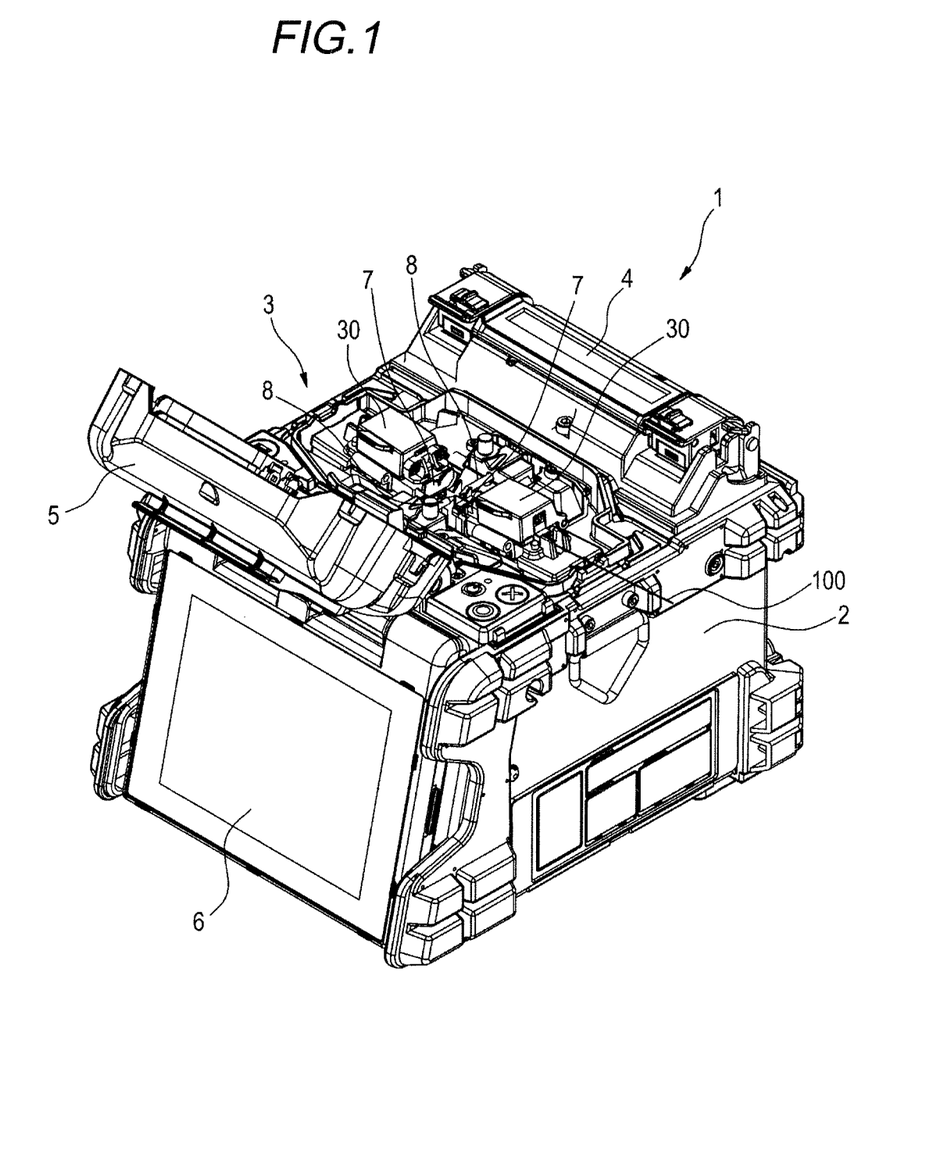
FIG. 1 is a perspective view showing a structural example of a fusion-splicing apparatus according to an embodiment of the present invention.

FIG. 1 is a perspective view showing an appearance of a fusion-splicing apparatus according to the present embodiment.

A fusion-splicing apparatus 1 is an apparatus for fusion-splicing glass fibers 101 (see FIG. 2) exposed from an optical fiber 100 (an example of the first optical fiber) and for reinforcing a fusion-splicing part (an example of a terminal processing part) on site where work of optical fiber equipment is conducted, for example. As shown in FIG. 1, the fusion-splicing apparatus 1 includes a box-shaped casing 2. An upper part of the casing 2 is provided with a fusion processing unit 3 for fusing the glass fibers 101 of the optical fiber 100, and a reinforcement device 4 for heat shrinking a fiber reinforcement sleeve (not shown) covering the fusion-splicing part of the optical fiber 100 fusion-spliced by the fusion processing unit 3. Further, the fusion-splicing apparatus 1 includes a windshield cover 5 which is coupled to the casing 2 so as to openably and closably cover the fusion processing unit 3 and is used for preventing wind from entering the fusion processing unit 3.

The fusion-splicing apparatus 1 further includes a monitor 6 which displays a fusion-splicing status of the glass fibers 101 captured by a camera (not shown) disposed in the casing 2. The monitor 6 displays an image of a fusing place of the glass fiber 101 captured by a microscope including an imaging element such as a CCD, for example. An operator can conduct the fusion operation while viewing the image on the monitor 6. The monitor 6 also serves as an operation unit for operating the fusion processing unit 3 and the reinforcement device 4, and various operations can be made by touching the monitor 6.

A pair of optical fiber holders 30 each holding to fix an optical fiber 100 is attached to the fusion processing unit 3. Further, the fusion processing unit 3 includes a pair of fiber positioning parts 7 which are disposed between the pair of optical fiber holders 30 and are used for positioning the glass fibers 101 of the optical fibers 100 each held by the pair of optical fiber holders 30, and a pair of discharge electrodes 8 which are disposed between the fiber positioning parts 7 and are used for fusion-splicing tips of the glass fibers 101 by arc discharge.

Figure 2:
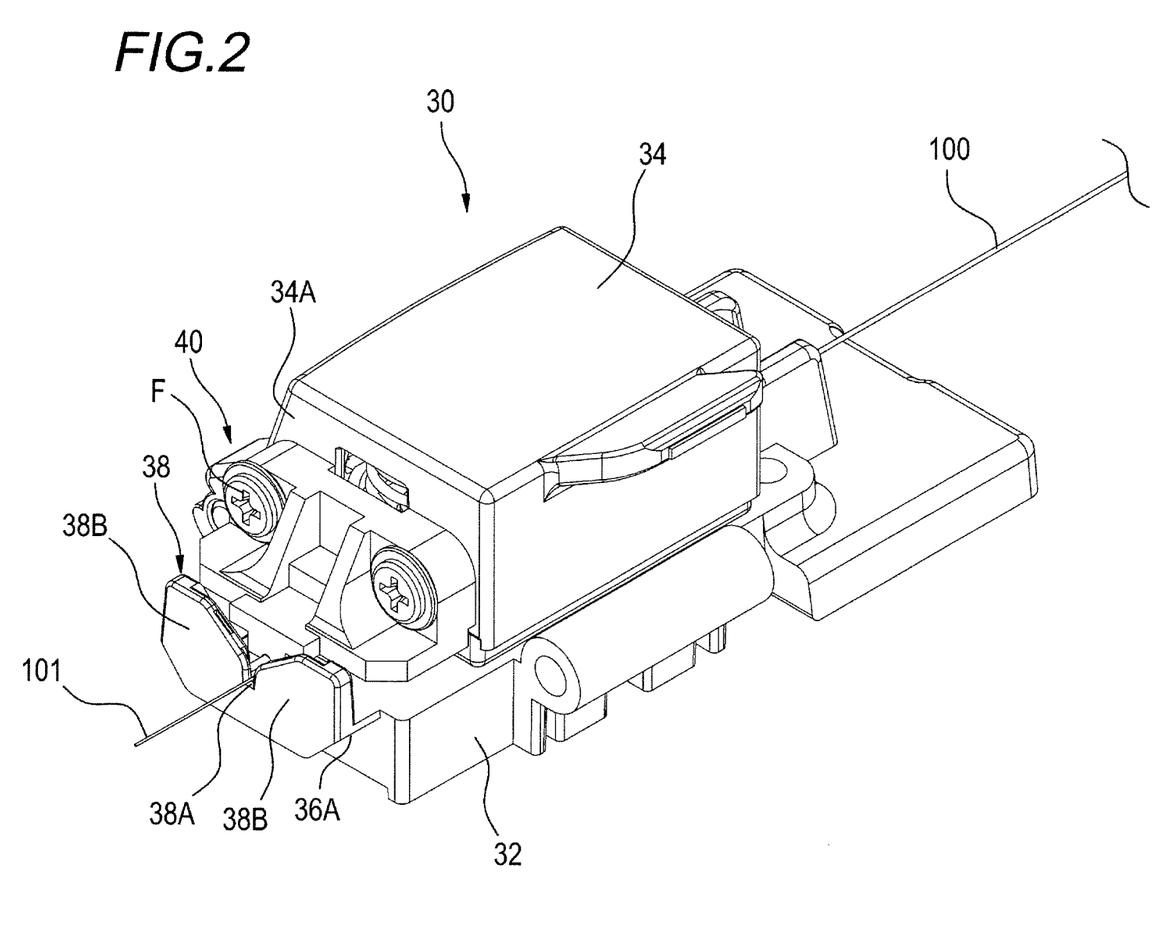
FIG. 2 is a perspective view of an optical fiber holder included in the fusion-splicing apparatus of FIG. 1.
Figure 3:
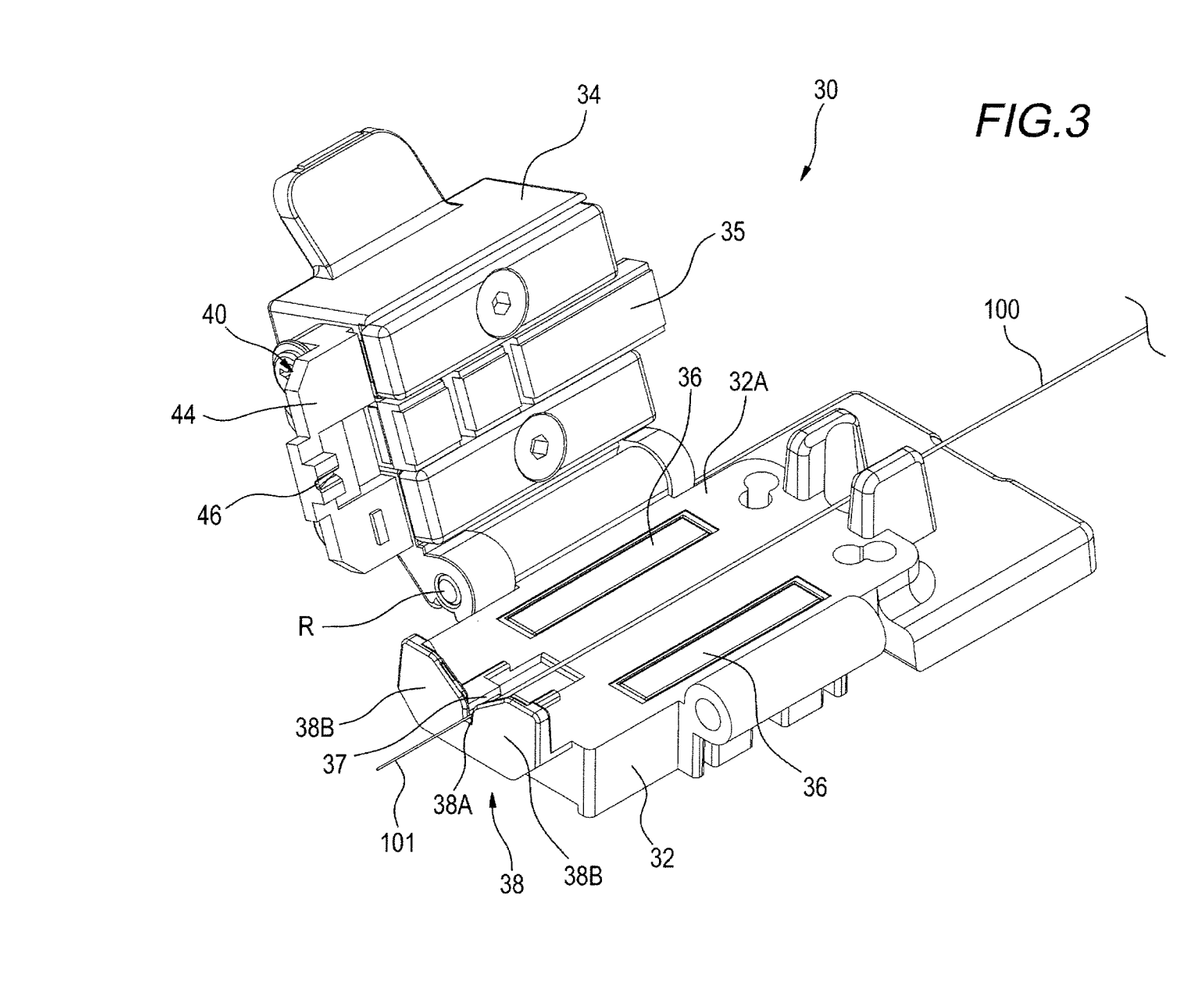
FIG. 3 is a perspective view showing a state where a lid body of the optical fiber holder of FIG. 2 is opened.

FIG. 2 is a perspective view showing an example of the optical fiber holder 30 attachable to the fusion-splicing apparatus 1. FIG. 3 is a perspective view showing a state where a lid body of the optical fiber holder 30 shown FIG. 2 is opened.

The optical fiber holder 30 includes a holder body part 32 and a lid body 34, and the optical fiber 100 can be held to be fixed between the holder body part 32 and the lid body 34. The optical fiber holder 30 can switch the optical fiber 100 between holding to fix and release holding by closing and opening the lid body 34 with respect to the holder body part 32. As shown in FIG. 3, the optical fiber 100 (and an optical fiber 200 or a drop cable 300 which are described later) is mounted on an upper surface 32A of the holder body part 32. On the upper surface 32A of the holder body part 32, a pair of magnets 36 are provided on both sides of a place on which the optical fiber 100 is mounted. On an end part of the holder body part 32 (an end part close to the fusion-splicing part of the optical fiber 100), an upward protruding part 38 (an example of a first regulating part) is provided so as to protrude upward. The upward protruding part 38 includes a recessed part 38A for projecting the glass fiber 101 exposed from the optical fiber 100 outward of the optical fiber holder 30, and a pair of wall parts 38B provided on both sides of the recessed part 38A. The upper surface 32A is formed with a groove part 37 for accommodating a coated part of the optical fiber 100 on an upward protruding part side.

The lid body 34 is disposed so as to couple to the holder body part 32 rotatably around a rotation shaft R and is configured to open and close the upper surface 32A of the holder body part 32. When the upper surface 32A of the holder body part 32 is blocked to be closed, the lid body 34 is locked in a closed state by the pair of magnets 36 embedded in the holder body part 32. An inner surface side of the lid body 34 is provided with a pressing member 35 at a position corresponding to a place where the optical fiber 100 is mounted. The pressing member 35 is always urged in a closed direction of the lid body 34 by two spring members 35A (see FIG. 6A or the like) disposed between the lid body 34 and the pressing member 35. Accordingly, when the lid body 34 is closed with respect to the holder body part 32, the pressing member 35 can hold to fix the optical fiber 100 by pressing the same.

An end part 34A of the lid body 34 (an end part close to the fusion-splicing part of the optical fiber 100) is attached with a fiber posture correction block 40 (hereinafter, referred to as a block 40).

Figure 4A:
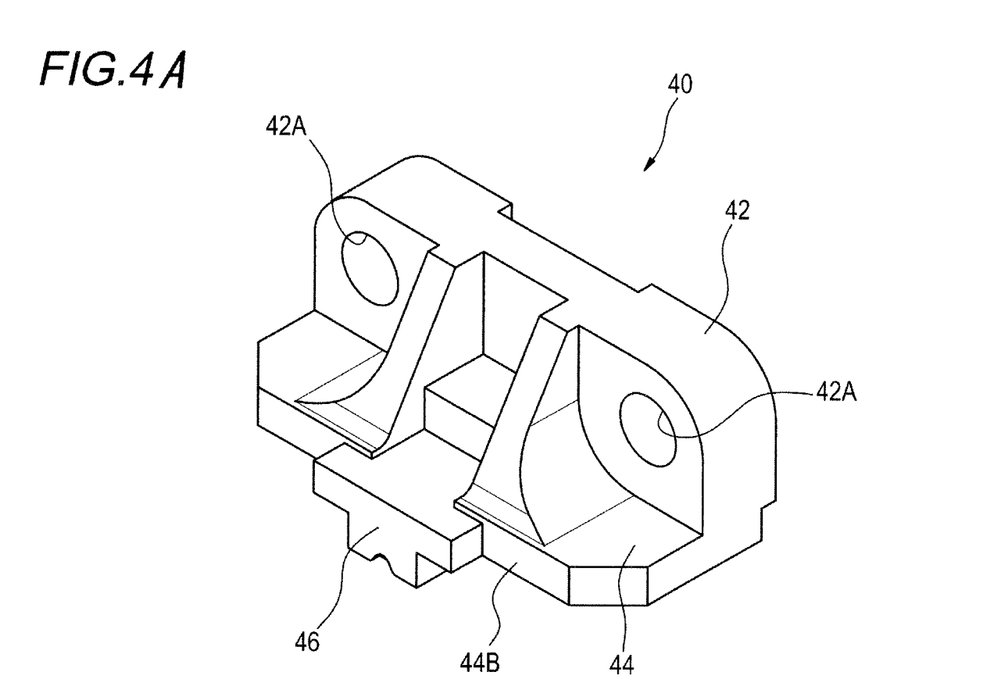
FIG. 4A is a front perspective view of a fiber posture correction block attachable to the optical fiber holder of FIG. 3.
Figure 4B:
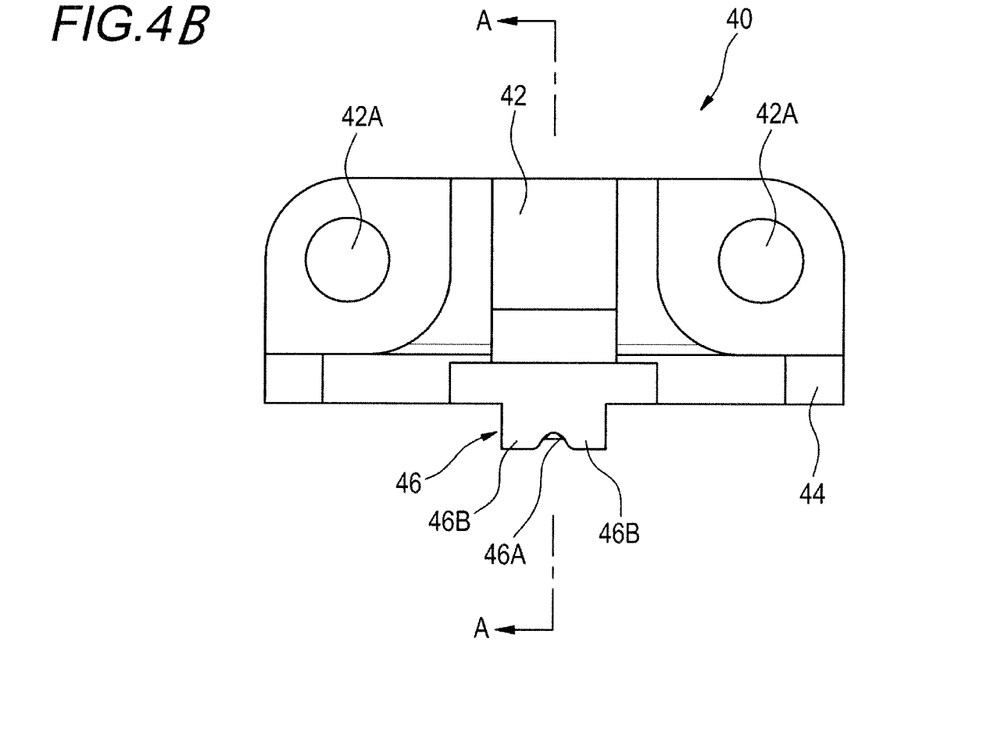
FIG. 4B is a front view of the fiber posture correction block shown in FIG. 4A.
Figure 5A:
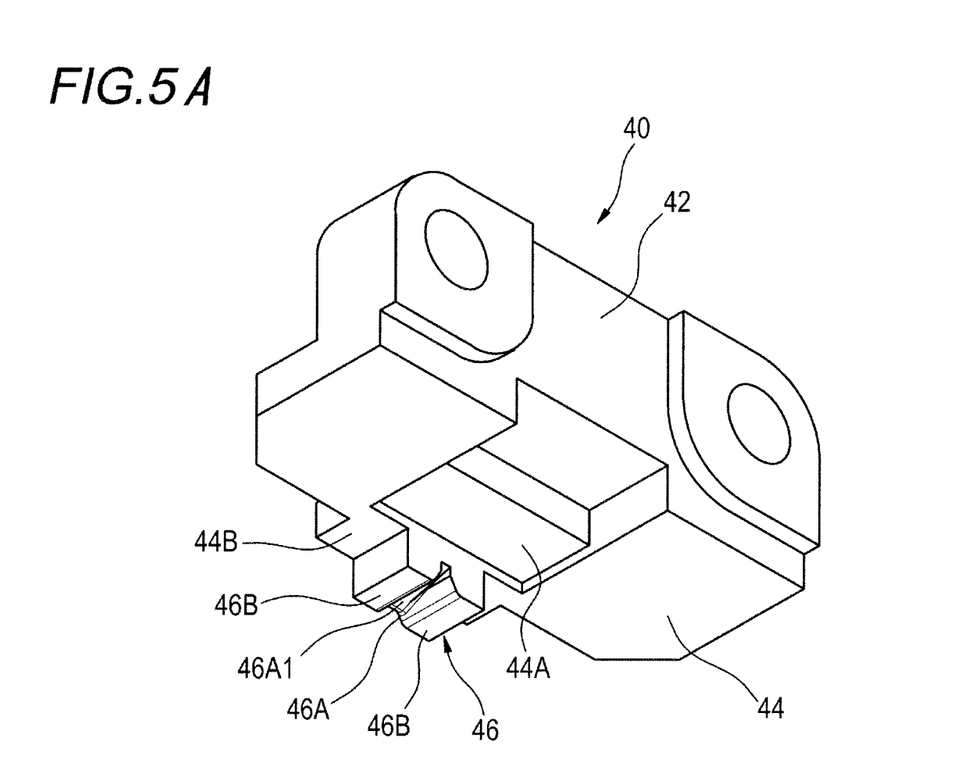
FIG. 5A is a rear perspective view of the fiber posture correction block.
Figure 5B:
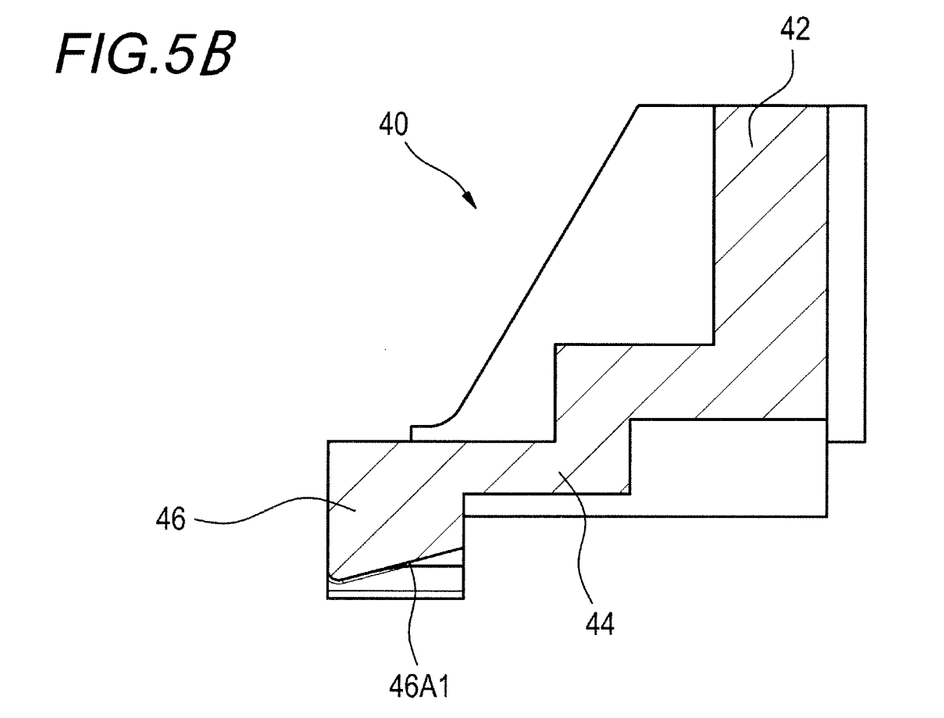
FIG. 5B is a cross sectional view of the fiber posture correction block shown in FIG. 5A taken along a line A-A.

FIG. 4A is a front perspective view of the block 40 attachable to the optical fiber holder 30 of FIG. 3. FIG. 4B is a front view of the block 40. FIG. 5A is a rear perspective view of the block 40. FIG. 5B is a cross sectional view of the block 40 along the line A-A.

The block 40 includes an attachment part 42, a front protruding part 44, and a downward protruding part 46 (an example of a contact part). The attachment part 42 is a part attached to the end part 34A of the lid body 34 by screws F and formed with a pair of attachment holes 42A through which the screws F are inserted. The front protruding part 44 is a part protruding from a lower end side of the attachment part 42 toward a front (here, the front is defined as a side opposite to the lid body 34). As shown in FIG. 5A, a lower surface of the front protruding part 44 is formed with a recessed part 44A for accommodating a coated part of a drop cable 300 (described later). An end part 44B of the front protruding part 44 (an end part close to the fusion-splicing part of the optical fiber 100) is formed with a downward protruding part 46 protruding from the front protruding part 44 downward. The downward protruding part 46 includes a recessed part 46A extending in parallel with a longitudinal direction of the optical fiber 100, and a pair of wall parts 46B (an example of a second regulating part) provided downward on both sides of the recessed part 46A. The recessed part 46A includes an inclined surface 46A1 (an example of an inclined part), which is formed as an arc shape by the pair of wall parts 46B on an end surface thereof, as shown in FIG. 4B, and is inclined upward from a front of the downward protruding part 46 toward a rear (a front projecting part 44 side), as shown in FIG. 5B.

FIGS. 6A to 8B are views showing states where a plurality of kinds of optical fibers having different outer diameters (for example, the optical fiber 100 having an outer diameter of 0.25 mm, the optical fiber 200 having an outer diameter of 0.9 mm, and the drop cable 300 having a width of 3 mm) are held to be fixed by the optical fiber holder 30 thus configured.

Figure 6A:
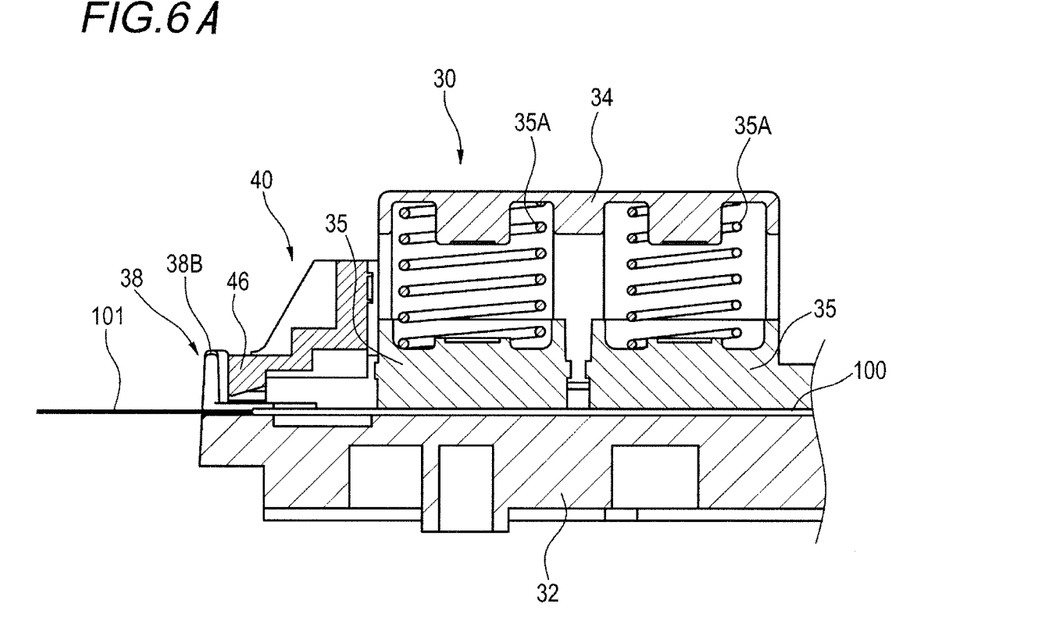
FIG. 6A is a cross sectional view showing a state where an optical fiber having an outer diameter of 0.25 mm is held to be fixed by the optical fiber holder of the present embodiment.
Figure 6B:
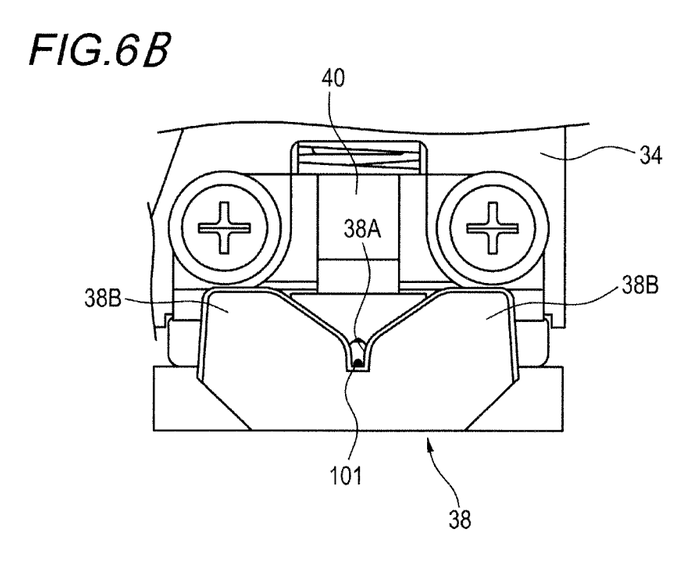
FIG. 6B is an end view of the optical fiber holder in the state shown in FIG. 6A as seen from a fusion-splicing part side.

FIGS. 6A and 6B show a state where the optical fiber 100 having an outer diameter of 0.25 mm is held to be fixed by the optical fiber holder 30. The optical fiber 100 is, for example, a fiber which is coated by an ultraviolet curing resin around the glass fiber 101 and has a diameter of 0.25 mm.

In a case where the optical fiber 100 having a small diameter is held to be fixed by the optical fiber holder 30, the operator firstly opens the lid body 34 of the optical fiber holder 30 attached to the fusion processing unit 3 of the fusion-splicing apparatus 1. Then, the operator mounts (the coated part of) the optical fiber 100 onto the upper surface 32A of the holder body part 32, and places the glass fiber 101 exposed on a tip of the optical fiber 100 into the recessed part 38A of the upward protruding part 38 of the optical fiber holder 30. Further, the operator places the tip of the glass fiber 101 projected from the optical fiber holder 30 into the fiber positioning parts 7 (see FIG. 1). In this state, as shown in FIGS. 6A and 6B, the movement of (the glass fiber 101 of) the optical fiber 100 in a lateral direction is regulated by the pair of wall parts 38B formed on both sides of the recessed part 38A of the upward protruding part 38. Finally, when the operator closes the lid body 34 and the block 40 attached to the lid body 34, the optical fiber 100 is held to be fixed by the optical fiber holder 30.

In this way, in the case where the optical fiber 100 having a small diameter is held to be fixed by the optical fiber holder 30, the coated part of the optical fiber 100 is held between the upper surface 32A of the holder body part 32 and the pressing member 35 of the lid body 34, and the glass fiber 101 of the optical fiber 100 is accommodated in a state of being positioned on the recessed part 38A of the upward protruding part 38. Accordingly, the glass fiber 101 of the optical fiber 100 can be appropriately mounted on the fiber positioning part 7, and the fusion-splicing part of the glass fiber 101 can be accurately positioned between the discharge electrodes 8. That is, occurrence of unintended bending or disconnection of the optical fiber 100 due to contact of the glass fiber 101 with a place other than the fiber positioning part 7 or the like can be prevented.

Figure 7A:
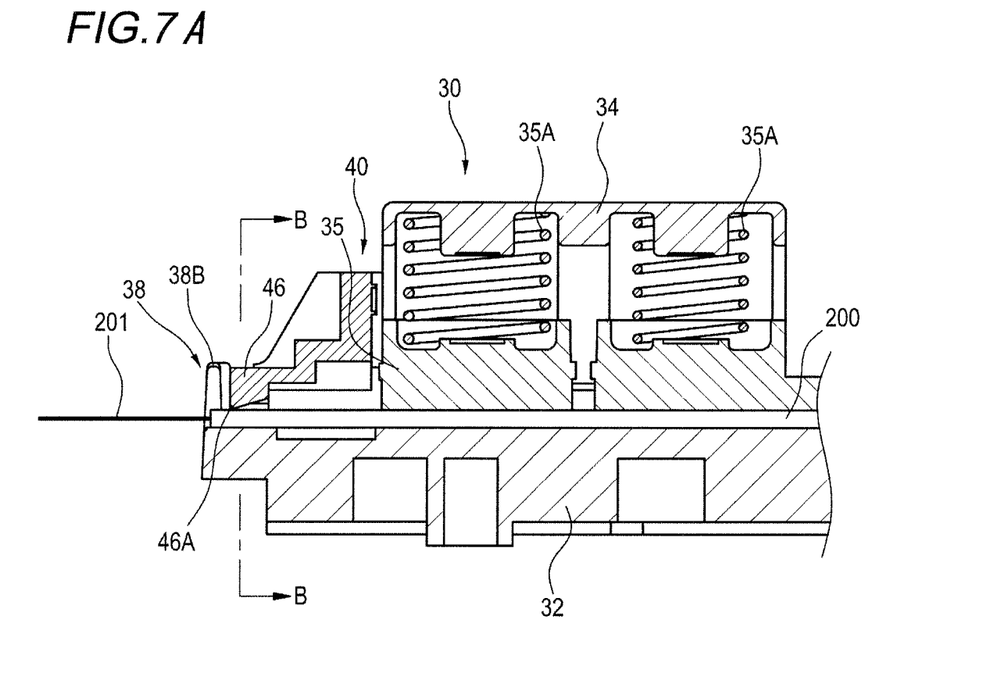
FIG. 7A is a cross sectional view showing a state where an optical fiber having an outer diameter of 0.90 mm is held to be fixed by the optical fiber holder of the present embodiment.
Figure 7B:
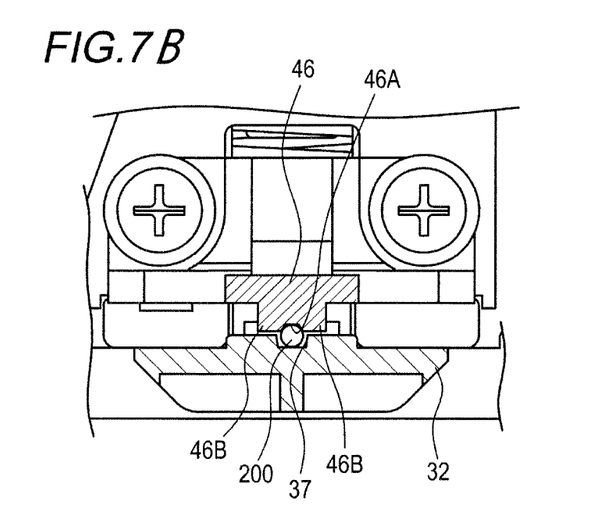
FIG. 7B is a cross sectional view of the optical fiber holder in the state shown in FIG. 7A taken along a line B-B.

FIGS. 7A and 7B show a state where the optical fiber 200 having an outer diameter (e.g., 0.9 mm) larger than that of the optical fiber 100 is held to be fixed by the optical fiber holder 30. The optical fiber 200 (an example of the second optical fiber) is, for example, a fiber which is coated by an ultraviolet curing resin and a thermoplastic resin around a glass fiber 201 and has a diameter of 0.9 mm.

In a case where the optical fiber 200 having a diameter larger than that of the optical fiber 100 is held to be fixed by the optical fiber holder 30, the operator firstly opens the lid body 34 of the optical fiber holder 30 attached to the fusion processing unit 3 of the fusion-splicing apparatus 1. Then, the operator mounts (a coated part of) the optical fiber 200 onto the upper surface 32A of the holder body part 32, and places the glass fiber 201 exposed on a tip of the optical fiber 200 into the recessed part 38A of the upward protruding part 38 of the optical fiber holder 30. Further, the operator places the tip of the glass fiber 201 projected from the optical fiber holder 30 into the fiber positioning part 7. Finally, when the operator closes the lid body 34 and the block 40 attached to the lid body 34, as shown in FIGS. 7A and 7B, the coated part of the optical fiber 200 is held between the groove part 37 formed on the upper surface 32A of the holder body part 32 and the arc-shaped recessed part 46A (a part interposed between the pair of wall parts 46B) formed on the downward protruding part 46 of the block 40. Accordingly, the movement of the optical fiber 200 to the lateral direction is regulated.

In this way, in the case where the optical fiber 200 having a large diameter is held to be fixed by the optical fiber holder 30, the coated part of the optical fiber 200 is accommodated in a state of being positioned between the groove part 37 and the recessed part 46A, and the glass fiber 201 is accommodated in a state of being positioned on the recessed part 38A of the upward projecting part 38, similar to the optical fiber 100 shown in FIGS. 6A and 6B. Accordingly, the glass fiber 201 of the optical fiber 200 can be appropriately mounted on the fiber positioning part 7, and the fusion-splicing part of the glass fiber 201 can be accurately positioned between the discharge electrodes 8. That is, occurrence of unintended bending or disconnection of the optical fiber 200 due to contact of the glass fiber 201 with a place other than the fiber positioning part 7 or the like can be prevented.

Figure 8A:
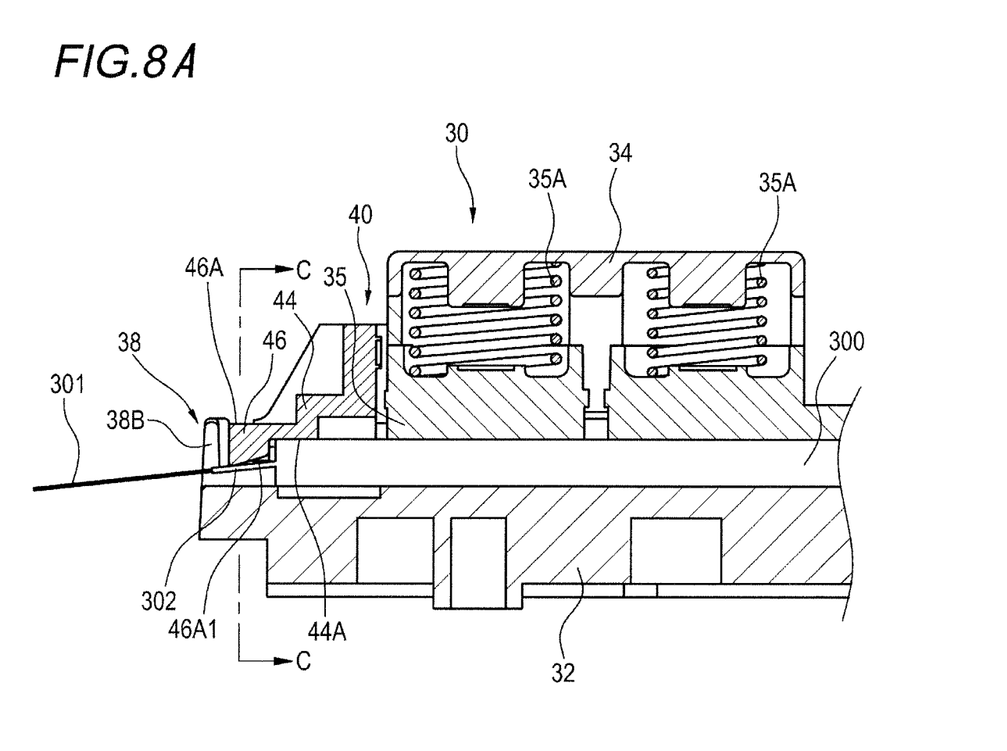
FIG. 8A is a cross sectional view showing a state where a drop cable is held to be fixed to the optical fiber holder of the present embodiment.
Figure 8B:
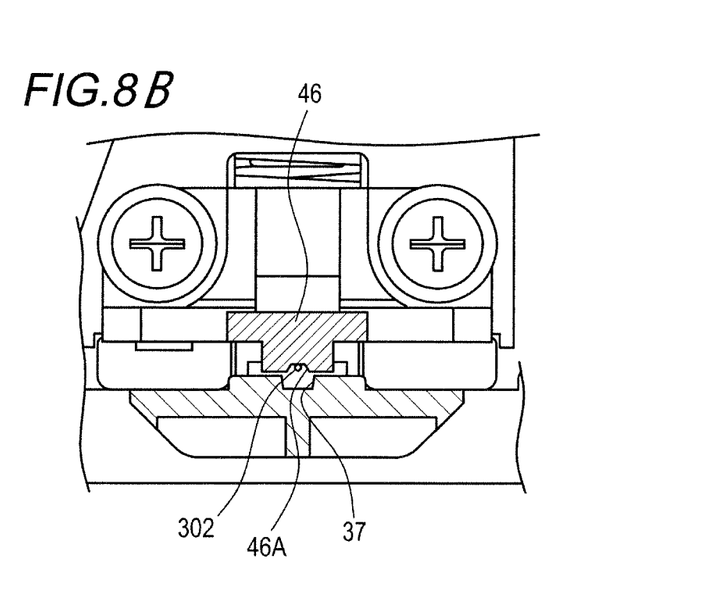
FIG. 8B is a cross sectional view of the optical fiber holder in the state shown in FIG. 8A taken along a line C-C.

FIGS. 8A and 8B show a state where the drop cable 300 having a size different from those of the optical fibers 100 and 200, e.g., having a lateral width of 3 mm, is held to be fixed by the optical fiber holder 30. The drop cable 300 is configured by, for example, coating the optical fiber with a jacket formed of a flame-resistant resin or the like. On a tip of the drop cable 300, an optical fiber 302 and a glass fiber 301 are exposed stepwise.

In a case where the drop cable 300 is held to be fixed by the optical fiber holder 30, the operator firstly opens the lid body 34 of the optical fiber holder 30 attached to the fusion processing unit 3 of the fusion-splicing apparatus 1. Then, the operator mounts (the jacket part of) the drop cable 300 onto the upper surface 32A of the holder body part 32, and places the glass fiber 301 exposed on the tip of the drop cable 300 into the recessed part 38A of the upward protruding part 38 of the optical fiber holder 30. Further, the operator places the tip of the glass fiber 301 projected from the optical fiber holder 30 into the fiber positioning part 7. Finally, when the operator closes the lid body 34 and the block 40 attached to the lid body 34 are closed, as shown in FIGS. 8A and 8B, the jacket part of the drop cable 300 is held to be fixed between the upper surface 32A of the holder body part 32 and the pressing member 35 of the lid body 34. At this time, a tip end of the jacket part of the drop cable 300 is accommodated in the recessed part 44A formed on the lower surface of the front projecting part 44. Accordingly, the movement of the drop cable 300 in the lateral direction is regulated. Further, the optical fiber 302 exposed on the tip of the drop cable 300 is in contact with the inclined surface 46A1 of the recessed part 46A formed on the downward protruding part 46 of the block 40. Accordingly, the posture of the optical fiber 302 is corrected downward along the inclined surface 46A1.

In this way, in the case where the drop cable 300 is held to be fixed by the optical fiber holder 30, the optical fiber 302 is corrected downward along the inclined surface 46A1, so that the glass fiber 301 is accommodated in the recessed part 38A of the upward protruding part 38. Accordingly, the glass fiber 301 of the drop cable 300 can be appropriately mounted on the fiber positioning part 7, and the fusion-splicing part of the glass fiber 301 can be accurately positioned between the discharge electrodes 8. That is, occurrence of unintended bending or disconnection of the drop cable 300 due to contact of the glass fiber 301 of the drop cable 300 with a place other than the fiber positioning part 7 or the like can be prevented.

As described above, the optical fiber holder 30 according to the present embodiment includes: the holder body part 32 where the optical fiber 100, the optical fiber 200 and the drop cable 300 are mountable on the upper surface 32A; the lid body 34 which is disposed to be openable and closable with respect to the upper surface 32A of the holder body part 32; and the fiber posture correction block 40 which is provided on the lid body 34 on a side close to the fusion-splicing part of the optical fiber 100 or the like. In addition, the holder body part 32 includes the upward protruding part 38 on the end part 32B on a fusion-splicing part side which regulates the movement of the glass fibers 101, 201, or 301 exposed from the optical fibers 100, 200 or the drop cable 300 in the lateral direction, and the block includes the downward protruding part 46 to be in contact with the optical fiber 200 or the optical fiber 302 of the drop cable 300 at the end part 40A of the block 40 on the fusion-splicing part side. According to this configuration, the optical fiber holder 30 can hold to fix the plurality of kinds of optical fibers 100 and 200 and the drop cable 300 having different outer diameters by appropriately positioning the same. Therefore, in a case of attaching the optical fiber holder 30 to the fusion-splicing apparatus 1, since there is no need to change the optical fiber holder 30 or to change the attachment position of the optical fiber holder 30 even though the types of the optical fibers as fusion-splicing objects are changed, the efficiency of the fusion-splicing operation using the fusion-splicing apparatus 1 can be greatly improved.

While the present invention has been described in detail and with reference to specific embodiments in the above, it will be apparent to those skilled in the art that various changes and modifications can be made without departing from the spirit and scope of the invention. In addition, the number, position, shape, or the like of the constituent members described above are not limited to the above embodiments, and can be changed to a suitable number, position, shape, or the like for implementing the present invention.

DESCRIPTION OF REFERENCE NUMERALS

1: Fusion-splicing apparatus of optical fiber
2: Casing
3: Fusion processing unit
4: Reinforcement device
5: Windshield cover
6: Monitor
7: A pair of fiber positioning parts
8: A pair of discharge electrodes
30: Optical fiber holder
32: Holder body part
34: Lid body
35: Pressing member
36: Magnet
38: Upward protruding part
38A: Recessed part
38B: A pair of wall parts (an example of first regulating part)
40: Fiber posture correction block
42: Attachment part
44: Front protruding part
44A: Recessed part
46: Downward protruding part (an example of contact part)
46A: Recessed part
46A1: Inclined surface (an example of inclined part)
46B: A pair of wall parts (an example of second regulating part)
100: Optical fiber (an example of first optical fiber)
101: Glass fiber (an example of first glass fiber)
200: Optical fiber (an example of second optical fiber)
201: Glass fiber (an example of second glass fiber)
300: Drop cable (an example of third optical fiber)
301: Glass fiber
302: Optical fiber

The invention claimed is:

1. An optical fiber holder for holding an optical fiber, comprising:
a holder body part on which a first optical fiber and a second optical fiber are mountable, the second optical fiber having a coated part with an outer diameter larger than that of a coated part of the first optical fiber;
a lid body which is disposed to be openable and closable with respect to the holder body part; and
a fiber posture correction block which is provided on the lid body on a side close to a terminal processing part of the first optical fiber and the second optical fiber,
wherein the holder body part includes a first regulating part at an end part thereof on a terminal processing part side, and the first regulating part is configured to regulate movement of a first glass fiber exposed from the first optical fiber and a second glass fiber exposed from the second optical fiber, wherein the fiber posture correction block includes a contact part to be in contact with the second optical fiber at an end part thereof on the terminal processing part side, wherein an inner surface side of the contact part includes an inclined part configured to correct a posture of a third optical fiber which is configured by providing a jacket on an outer circumference of the first optical fiber or the second optical fiber, and wherein the inclined part is inclined in a direction of a longitudinal axis of the third optical fiber.

2. The optical fiber holder according to claim 1,
wherein the contact part includes a second regulating part configured to regulate movement of the second optical fiber.

3. The optical fiber holder according to claim 1,
wherein the fiber posture correction block is formed with a recessed part configured to accommodate the jacket of the third optical fiber on a side closer to the lid body than the contact part.

4. A fusion-splicing apparatus, comprising:
the optical fiber holder according to claim 1,
the fusion-splicing apparatus being configured to fusion-splice optical fibers held by the optical fiber holder.

\* \* \* \* \*